United States Patent [19]
Kahle et al.

[11] Patent Number: 5,715,420
[45] Date of Patent: Feb. 3, 1998

[54] METHOD AND SYSTEM FOR EFFICIENT MEMORY MANAGEMENT IN A DATA PROCESSING SYSTEM UTILIZING A DUAL MODE TRANSLATION LOOKASIDE BUFFER

[75] Inventors: James Allan Kahle, Austin; Albert J. Loper, Cedar Park; Aubrey Deene Ogden, Round Rock, all of Tex.; John Victor Sell, Los Altos; Gregory L. Limes, Fremont, both of Calif.

[73] Assignee: International Business Machines Corporation, Armonk, N.Y.

[21] Appl. No.: 387,147

[22] Filed: Feb. 10, 1995

[51] Int. Cl.[6] .................. G06F 12/00; G06F 12/10; G06F 12/14
[52] U.S. Cl. .................. 395/416; 395/412; 395/413; 395/415; 395/417; 395/418; 395/490; 395/491
[58] Field of Search .................. 364/200; 395/412, 395/416, 418, 490, 491, 413, 415, 417, 403, 306; 380/4

[56] References Cited

U.S. PATENT DOCUMENTS

| 4,481,573 | 11/1984 | Fukunaga et al. | 364/200 |
|---|---|---|---|
| 4,581,702 | 4/1986 | Saroka et al. | 395/417 |
| 4,677,546 | 6/1987 | Freeman et al. | 395/413 |
| 4,794,524 | 12/1988 | Carberry et al. | 364/200 |
| 4,899,275 | 2/1990 | Sachs et al. | 395/403 |
| 4,959,860 | 9/1990 | Watters et al. | 380/4 |
| 5,222,222 | 6/1993 | Mehring et al. | 395/400 |
| 5,265,227 | 11/1993 | Kohn et al. | 395/417 |
| 5,276,878 | 1/1994 | Sutton et al. | 395/439 |
| 5,282,274 | 1/1994 | Liu | 395/416 |
| 5,319,760 | 6/1994 | Mason et al. | 395/418 |
| 5,392,441 | 2/1995 | Brasher et al. | 395/306 |

OTHER PUBLICATIONS

IBM Technical Disclosure Bulletin, vol. 22, No. 5, Oct. 1979, "Replacement of SSK Instruction in a Paging Environment".
IBM Technical Disclosure Bulletin, vol. 23, No. 12, May 1981, "Dynamic Address Translator for I/O Channels".
IBM Technical Disclosure Bulletin, vol. 29, No. 7, Dec. 1986, "Fast Path Virtual Equal Real Addressing".
IBM Technical Disclosure Bulletin, vol. 33, No. 6B, Nov. 1990, "Low-Synchronization Translation Lookaside Buffer Consistency Algorithm".
IBM Technical Disclosure Bulletin, vol. 34, No. 4A, Sep. 1991, "Linear-to-Physical Memory Mapping by Bus Masters in Virtual Memory Systems".
IBM Technical Disclosure Bulletin, vol. 34, No. 4B, Sep. 1991, "Technique for Virtual Memory Architecture to Support Checkpoint and Rollback Recovery".
IBM Technical Disclosure Bulletin, vol. 34, No. 10B, Mar. 1992, "Software Recovery of Page Faults on Microprocessors With Integrated Memory Management Units".

*Primary Examiner*—Jack A. Lane
*Assistant Examiner*—Than V. Nguyen
*Attorney, Agent, or Firm*—Mark E. McBurney; Andrew J. Dillon

[57] ABSTRACT

A method and system for efficient memory management in a data processing system which utilizes a memory management unit to translate effective addresses into real addresses within a translation lookaside buffer is disclosed. During a first mode of operation a selected number of effective address identifiers are stored in the translation lookaside buffer. In association with each virtual address identifier is a corresponding real address entry for a single memory block wherein selected virtual addresses may be translated into corresponding real addresses utilizing the translation lookaside buffer. In a second mode of operation, a selected number of virtual address identifiers are stored in a translation lookaside buffer and each virtual address identifier has a number of protection bits stored in association therewith, wherein each protection bit is indicative of a protection status for a large number of contiguous memory blocks beginning with the associated virtual address identifier, wherein memory block protection may be provided for a large number of memory blocks utilizing a fixed size translation lookaside buffer.

15 Claims, 3 Drawing Sheets

METHOD AND SYSTEM FOR EFFICIENT MEMORY MANAGEMENT IN A DATA PROCESSING SYSTEM UTILIZING A DUAL MODE TRANSLATION LOOKASIDE BUFFER

BACKGROUND OF THE INVENTION

1. Technical Field

The present invention relates in general to an improved data processing system and in particular to an improved method and system for efficient memory management in a data processing system. Still more particularly the present invention relates to an improved method and system for efficient memory management in a data processing system utilizing a dual mode translation lookaside buffer.

2. Description of the Related Art

Modern data processing systems often utilize so-called "effective" or "virtual" address spaces to permit each application to utilize a "private" address space for that application. Consequently, such systems must utilize some technique to translate these "effective" addresses into real addresses within system memory. Of course, those skilled in the art will appreciate that it is possible for multiple effective addresses to map to a single real address. Thus, it is imperative to provide a technique which will permit efficient and rapid translation from an effective address into a real address, in order to accurately maintain the effective address space.

This mapping from effective memory address into real memory address is typically accomplished utilizing a memory management unit which supports mapping from the effective address space into the real address space. Such memory management units typically utilize a translation lookaside buffer which is provided within high speed memory to translate a limited number of effective addresses into real memory addresses.

Well known algorithms are typically utilized to determine which effective addresses will be stored within the translation lookaside buffer and which addresses will be replaced in the event a new effective address is required for translation. For example, the so-called "Least Recently Utilized" algorithm is frequently utilized due to the limited amount of high speed memory which is available for use as the translation lookaside buffer.

While this design works well for standard general processing applications a limited capacity of known translation lookaside buffers creates a difficulty in selected special purpose applications for these processors. In applications in which a large number of memory blocks containing data or instructions must be controlled the overhead involved in constantly loading, invalidating and reloading the translation lookaside buffer can be quite burdensome. Concomitantly, the cost involved in altering the size and organization of a translation lookaside buffer for a special purpose application is typically cost prohibitive.

As a result, it should be apparent that a need exists for an improved memory management unit which can efficiently manage diverse memory management scenarios within a data processing system.

SUMMARY OF THE INVENTION

It is therefore one object of the present invention to provide an improved data processing system.

It is another object of the present invention to provide an improved method and system for efficient memory management in a data processing system.

It is yet another object of the present invention to provide an improved method and system for efficient memory management in a data processing system utilizing a dual mode translation lookaside buffer.

The foregoing objects are achieved as is now described. A method and system for efficient memory management in a data processing system which utilizes a memory management unit to translate effective addresses into real addresses within a translation lookaside buffer is disclosed. During a first mode of operation a selected number of effective address identifiers are stored in the translation lookaside buffer. In association with each virtual address identifier is a corresponding real address entry for a single memory block wherein selected virtual addresses may be translated into corresponding real addresses utilizing the translation lookaside buffer. In a second mode of operation, a selected number of virtual address identifiers are stored in a translation lookaside buffer and each virtual address identifier has a number of protection bits stored in association therewith, wherein each protection bit is indicative of a protection status for a large number of contiguous memory blocks beginning with the associated virtual address identifier, wherein memory block protection may be provided for a large number of memory blocks utilizing a fixed size translation lookaside buffer.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
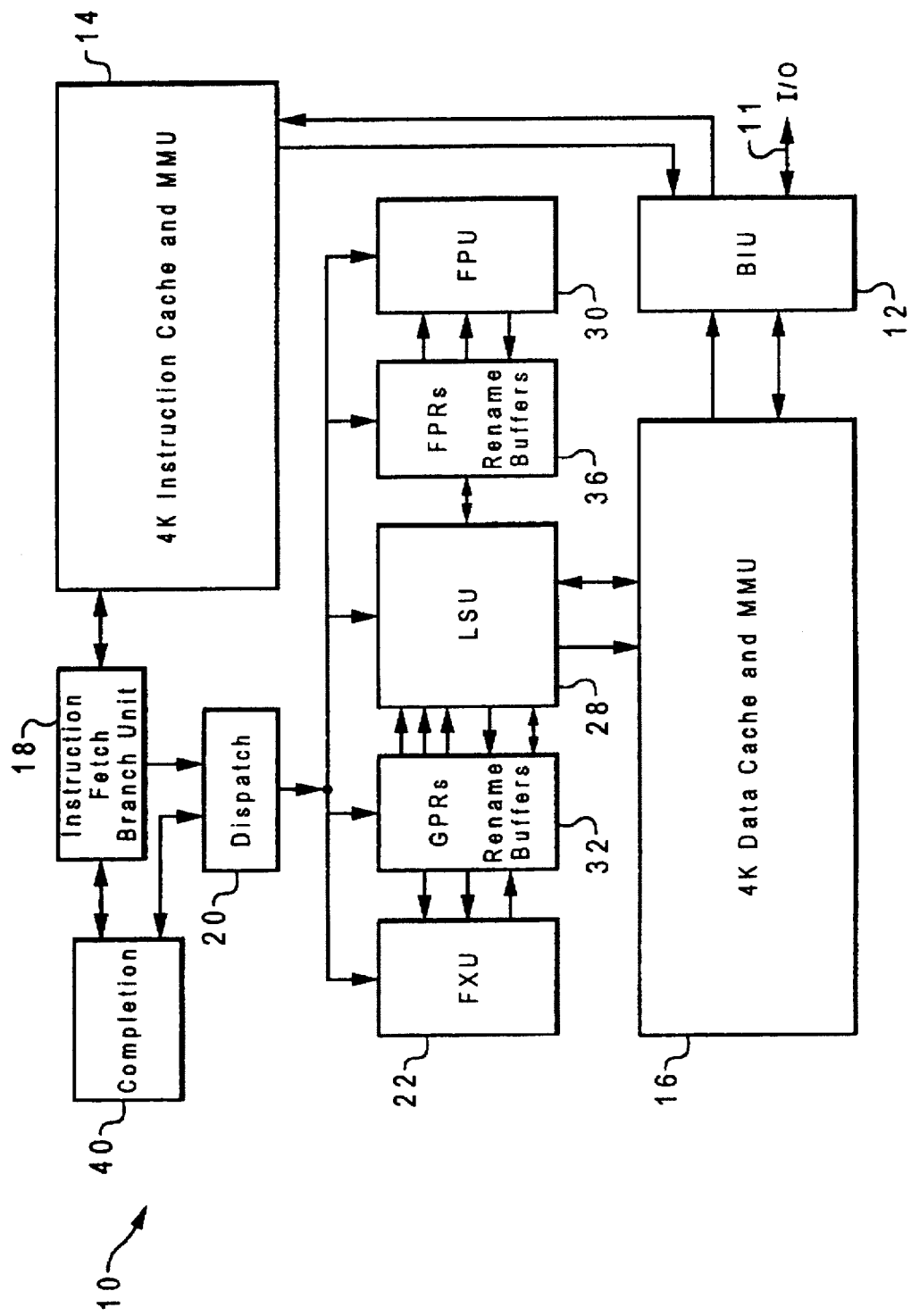
FIG. 1 is a high level block diagram of a data processing system which may be utilized to implement the method and system of the present invention.

With reference now to the figures and in particular with reference to FIG. 1, there is depicted a block diagram of a processor, indicated generally at 10, for processing information according to the preferred embodiment. In the preferred embodiment, processor 10 is a single integrated circuit superscalar microprocessor. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing (RISC) techniques. As shown in FIG. 1, a system bus 11 is connected to a bus interface unit (BIU) 12 of processor 10. BIU 12 controls the transfer of information between processor 10 and system bus 11.

BIU 12 is connected to an instruction cache 14 and to a data cache 16 of processor 10. A high-speed cache, such as instruction cache 14 or data cache 16, enables relatively fast access to a subset of data or instructions which were previously transferred from system memory to the cache, and thus improves the speed of operation of the data processing system. Instruction cache 14 outputs instructions to a branch unit 18. In response to such instructions from instruction cache 14, branch unit 18 selectively outputs instructions to other execution circuitry of processor 10.

The transfer of operands or instructions between system memory connected to system bus 11 and the data or instruction cache is usually effected in fixed-length units called blocks. A block of data may be transferred in varying sizes such as tracks, sectors, lines, bytes, etc., as are known in the art. When a memory access by the branch unit 18 allows retrieval of necessary data from the data cache 16, such success is called a cache "hit", and when retrieval of necessary data cannot be performed in the cache, and so must be performed from system memory or another processor cache, such failure is called a "miss". As those skilled in the art will appreciate, both instruction cache 14 and data cache 16 incorporate a memory management unit which is utilized to support the mapping of virtual memory addresses to real memory addresses within system memory. As will be described in greater detail herein, each memory management unit preferably utilizes a translation lookaside buffer to permit the rapid and accurate translation of virtual memory addresses into real addresses. In accordance with an important feature of the present invention each translation lookaside buffer may be operated within two separate modes and the description which follows of the translation lookaside buffer modes of operation is equally applicable to both instruction cache 14 and data cache 16.

In addition to branch unit 18, in the preferred embodiment the execution circuitry of processor 10 includes multiple execution units, namely a fixed point unit (FXU) 22, a Load-Store unit (LSU) 28, and a floating point unit (FPU) 30. FXU 22 and LSU 28 input their source operand information from general purpose architectural registers (GPRs) 32. FXU 22 and LSU 28 output results (destination operand information) of their operations for storage at selected entries in fixed point rename buffers in GPRs 32.

Moreover, LSU 28 inputs source operand information from floating point architectural registers (FPRs) 36. FPU 30 inputs its source operand information from FPRs 36, and LSU 28. LSU 28 and FPU 30 output results (destination operand information) of their operations for storage at selected entries in floating point rename buffers in FPRs 36.

In response to the instructions input from instruction cache 14, branch unit 18 selectively dispatches, through dispatch unit 20, the instructions to selected ones of execution units 22, 28, 30, 32, and 36. Each execution unit executes one or more instruction of a particular class of instructions. For example, FXU 22 executes a first class of fixed point mathematical operations on source operands, such as addition, subtraction, ANDing, ORing and XORing. FPU 30 executes floating point operations on source operands, such as floating point multiplication and division operations.

In response to a Load instruction, LSU 28 inputs information from data cache 16 and copies such information to selected ones of rename buffers in GPRs 32 and FPRs 36 and/or FPU 30. If such information is not stored in data cache 16, then data cache 16 inputs (through BIU 12 and system bus 11) such information from a system memory connected to system bus 11. Moreover, data cache 16 is able to output (through BIU 12 and system bus 11) information from data cache 16 to system memory connected to system bus 11.

In response to a Store instruction from branch unit 18, the LSU 28 generates the store address, and reads data from a selected one of GPRs 32 and FPRs 36. The store address and the data are then written to the data cache when the store instruction is ready to complete.

As information is stored at a selected one of rename buffers in GPRs 32, such information is associated with a storage location (e.g. one of GPRs 32) as specified by the instruction for which the selected rename buffer is allocated. Information stored at a selected one of the rename buffers is copied to its associated one of GPRs 32 in response to signals from branch unit 18. Branch unit 18 directs such copying of information stored at a selected one of the rename buffers in response to "completing" the instruction that generated the information, as indicated by completion unit 40. In the preferred embodiment, processor 10 may have multiple completions of instructions during a single cycle of processor 10.

As information is stored at a selected one of the rename buffers in FPRs 36, such information is associated with one of FPRs 36. Information stored at a selected one of the rename buffers is copied to its associated one of FPRs 36 in response to signals from branch unit 18. Branch unit 18 directs such copying of information stored at a selected one of the rename buffers in response to "completing" the instruction that generated the information, as indicated by completion unit 40. In the preferred embodiment, processor 10 may have multiple completions of instructions during a single cycle of processor 10.

Processor 10 achieves high performance by processing multiple instructions simultaneously at various ones of execution units 22, 28, 30, 32, and 36. Accordingly, each instruction is processed as a sequence of stages, each being executable in parallel with stages of other instructions. Such a technique is called "pipelining". An instruction is normally processed as five stages, namely fetch, decode/dispatch, execute, finish, and completion.

In the fetch stage, branch unit 18 selectively inputs (from instructions cache 14) one or more instructions from one or more memory addresses storing the sequence of instructions.

In the decode/dispatch stage, branch unit 18 decodes up to three fetched instructions and selectively dispatches up to three decoded instructions to selected (in response to the decoding in the decode stage) ones of execution units 22, 28, 30, 32, and 36 after reserving a rename buffer entry for each dispatched instructions' result (destination operand information). Processor 10 dispatches instructions in order of their programmed sequence. The branch unit assigns a unique tag to each instruction as the instruction identifier (IID).

In the execute stage, execution units execute their dispatched instructions as soon as the operands are ready. In the finish stage, execution units store output results (destination operand information) at selected entries in rename buffers as discussed further hereinabove. Each execution unit signals the branch unit that it has finished executing an instruction. The execution unit sends the instruction status along with the IID back to the branch unit.

Figure 2:
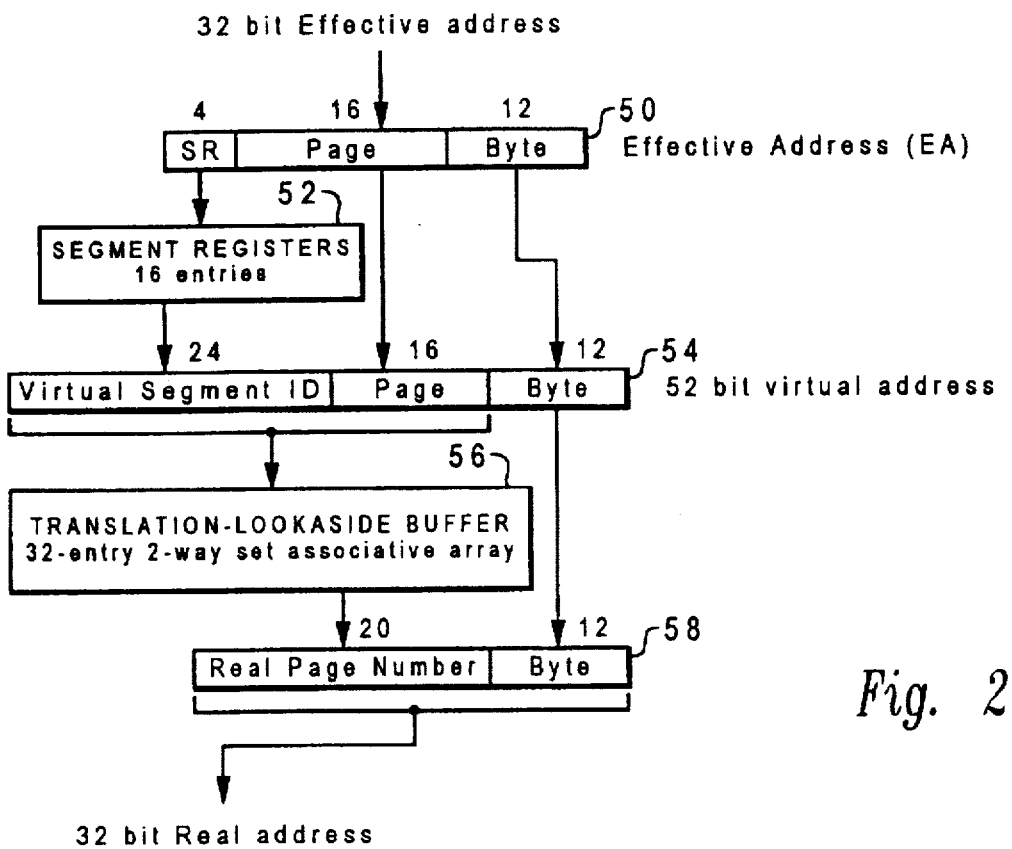
FIG. 2 is a high level block diagram illustrating the translation of a virtual address into a real address utilizing a translation lookaside buffer in accordance with a first mode of the method and system of the present invention.

Referring now to FIG. 2, there is depicted a high level block diagram illustrating the translation of a virtual address into a real address utilizing a translation lookaside buffer in accordance with a first mode of the method and system of the present invention. As illustrated, a thirty-two bit effective address is coupled to an effective address register and comprises a four bit segment register entry, a sixteen bit effective page entry and a twelve bit byte or offset entry. This thirty-two bit effective address is then utilized in combination with segment register 52 which determines a virtual segment identifier to create a fifty-two bit virtual address. The fifty-two bit virtual address comprises a twenty-four bit virtual segment identifier, and the sixteen bit page and byte or offset values which are unchanged from the effective address.

Next, in accordance with an important feature of the present invention, the twenty-four bit virtual segment identifier and the sixteen bit page identifier are taken from register 54 and utilized to access translation lookaside buffer 56. Translation lookaside buffer 56 is preferably a thirty-two entry, two-way set associative translation lookaside buffer which may be utilized to translate the virtual address identifier into a twenty bit real page number. That twenty bit real page number is then concatenated with the twelve bit byte offset in register 58 to form the thirty-two bit real address.

As those skilled in the art will appreciate thirty-two different virtual segment identifiers may be stored within translation lookaside buffer 56 in the depicted embodiment of the present invention and thus, periodically various addresses within translation lookaside buffer 56 will need to be replaced utilizing the commonly known "Least-Recently-Utilized" replacement algorithm.

Figure 3:
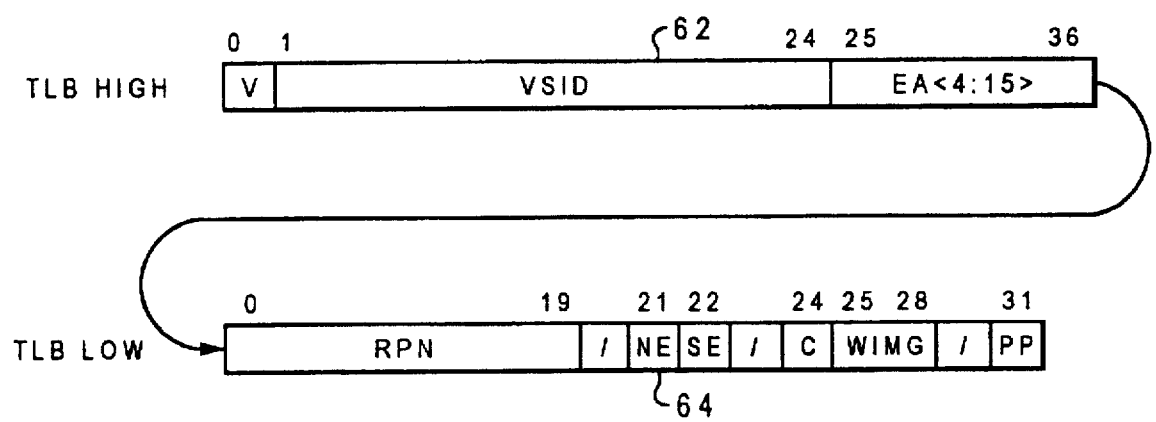
FIG. 3 is a high level block diagram illustrating each entry of the translation lookaside buffer of FIG. 2 when operated in accordance with the first mode of the method and system of the present invention.

With reference now to FIG. 3 there is depicted a high level block diagram which will illustrates the organization of translation lookaside buffer 56 of FIG. 2, when operated in accordance with the first mode of the method and system of the present invention. As illustrated, in FIG. 3, each entry 60 within translation lookaside buffer 56 includes an upper entry 62 which contains a single valid entry bit, a virtual segment identifier within bits 1-24 and bits 4-15 of the effective address. The lower thirty-two bits of translation lookaside buffer entry 60, as indicated at reference numeral 64, include a twenty bit real page number, two execute privilege bits which are utilized to inhibit execute privileges or grant special execution privileges in a manner not relevant to the present discussion, various page attribute bits which set forth the cache attributes for the particular data block and a page protection bit for that single real page number. In this manner, as is common in translation lookaside buffers of this type, a virtual address identifier may be utilized to translate an address into a real memory address within system memory in a rapid and efficient technique. However, the limited size of translation lookaside buffer 56 limits the number of addresses which may be translated at any given time to thirty-two different addresses.

As discussed above, certain special applications for processors require the control and protection of large amounts of memory and these operations are quite burdensome given the limited size of typical translation lookaside buffers utilized within processors of this type. Thus, in accordance with an important feature of the present invention, translation lookaside buffer 56 of FIG. 2 may be operated in a second mode of operation and utilized to determine the protection status of a large number of blocks of memory in the manner illustrated within FIG. 4.

As above, a thirty-two bit effective address is coupled to an effective address register 70 and the four most significant bits of the effective address and page identifier are utilized to create a twenty bit page identifier within register 74. The virtual segment identifier for the base segment within a particular group of segments is identified and provides a twenty-four bit process identifier which, together with the page identifier within register 74 is utilized to access translation lookaside buffer 76 in the second mode of operation. Translation lookaside buffer 76 is labeled utilizing a different reference numeral than is utilized in FIG. 2, since the application of the translation lookaside buffer is altered in this mode of operation.

Figure 4:
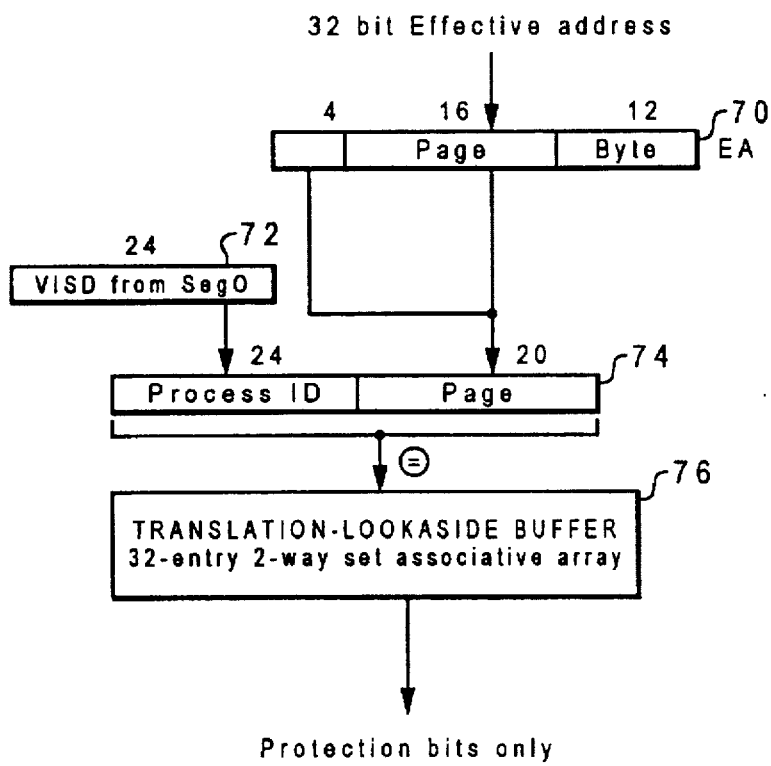
FIG. 4 is a high level block diagram illustrating a determination of protection status of a large number of blocks of memory utilizing a translation lookaside buffer in accordance with a second mode of the method and system of the present invention.

As depicted within FIG. 4, the output of translation lookaside buffer 76 comprises a single protection bit for each of a large number of blocks of memory. Those skilled in the art will appreciate that in applications within a data cache these protection bits will constitute write enable (WE) bits which determine whether or not a user may write to the memory block associated with that bit. If translation lookaside buffer 76 is utilized within an instruction cache then each protection bit constitutes an execute privilege bit and is utilized to determine whether or not the instruction represented within that block of memory may be executed.

Figure 5:
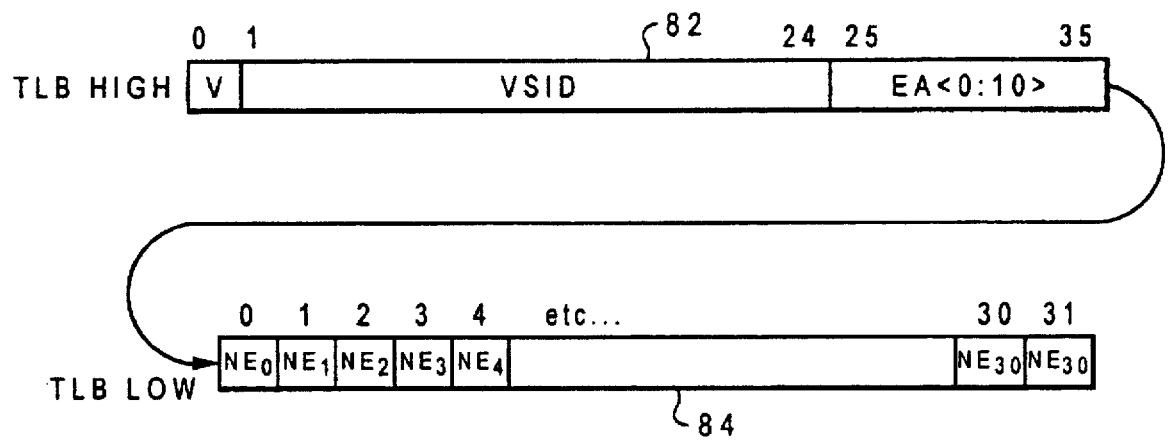
FIG. 5 is a high level block diagram of each entry of the translation lookaside buffer of FIG. 4, when operated in accordance with the second mode of the method and system of the present invention.

Finally, with respect to FIG. 5, there is depicted a high level block diagram illustrating the organization of the translation lookaside buffer of FIG. 4, when operated in accordance with the second mode of the method and system of the present invention. As above with respect to FIG. 3, a single valid entry bit is provided within each translation lookaside buffer entry 80 to indicate the validity of that entry. Next, twenty-four bits of virtual segment identifier and eleven bits of effective address are also utilized to identify the base memory block at which the large number of memory blocks begins for which protection status is to be controlled as indicated at reference numeral 82. Thereafter, as illustrated at reference numeral 84, in accordance with an important feature of the present invention, thirty-two separate protection bits are listed. Each protection bit indicative of the protection status of a single block or page of memory following the base block or page identified in the upper half of the entry of translation lookaside buffer entry 80. As described above, these protection bits may be utilized to prevent or permit execution of an instruction and to prevent or permit the writing of data to each page.

Thus, by providing a single protection bit for each of thirty-two memory blocks within each entry of a translation lookaside buffer memory protection may be provided in accordance with the method and system of the present invention for up to four megabytes of space at four kilobytes granularities in one hundred and twenty-eight kilobyte contiguous blocks. The system is highly flexible in that the entire four megabyte of memory need not be contiguous as the system only requires that each of the one hundred and twenty-eight kilobyte blocks of memory be contiguous and begin at the base entry listed within the upper half of the translation lookaside buffer entry. In this manner the number of times that the translation lookaside buffer must be invalidated and reloaded in applications which must access and protect large amounts of memory is substantially minimized without requiring a substantial change in the design and size of the translation lookaside buffer.

Upon reference to the foregoing those skilled in the art will appreciate that by utilizing a dual mode translation lookaside buffer the memory management unit of the present invention can support protection of large amounts of memory without high miss penalties while still complying with the design requirement that large amounts of high speed memory not be utilized for address translation.

While the invention has been particularly shown and described with reference to a preferred embodiment, it will be understood by those skilled in the art that various changes in form and detail may be made therein without departing from the spirit and scope of the invention.

We claim:

1. A method for efficient memory management in a data processing system which utilizes a memory management unit to translate virtual addresses into real addresses utilizing a translation lookaside buffer, said method comprising the steps of:

storing up to N virtual address identifiers within said translation lookaside buffer while operating in a first mode of operation, each virtual address identifier having an associated real address entry for a single memory block and a single protection bit stored in association therewith wherein a selected virtual address may be translated into a corresponding real address utilizing said translation lookaside buffer; and storing up to N virtual address identifiers within said translation lookaside buffer while operating in a second mode of operation, each virtual address identifier having M protection bits stored in association therewith, said M protection bits stored in place of said associated real address entry stored within said translation lookaside buffer when said translation lookaside buffer is operating in said first mode of operation, where M is greater than 1, said protection bits indicative of a protection status for each of M contiguous memory blocks beginning with an associated virtual address identifier wherein memory block protection may be provided for up to N×M memory blocks.

2. The method for efficient memory management in a data processing system according to claim 1, wherein said step of storing up to N virtual address identifiers within said translation lookaside buffer while operating in a first mode of operation further includes the step of storing a single protection bit in association with each virtual address identifier, said single protection bit indicative of a protection status for said associated real address entry.

3. The method for efficient memory management in a data processing system according to claim 2, wherein said step of storing up to N virtual address identifiers within said translation lookaside buffer while operating in a first mode of operation further includes the step of storing a plurality of attribute bits in association with each virtual address identifier, said plurality of attribute bits indicative of the cache attributes for said associated real address entry.

4. The method for efficient memory management in a data processing system according to claim 1, wherein each memory block contains data and wherein each of said M protection bits comprises a write protection status bit for an associated memory block.

5. The method for efficient memory management in a data processing system according to claim 1, wherein each memory block contains instructions and wherein each of said M protection bits comprises an execution protection status bit for an associated memory block.

6. A system for efficient memory management in a data processing system which utilizes a memory management unit to translate virtual addresses into real addresses utilizing a translation lookaside buffer, said method comprising the steps of:

means for storing up to N virtual address identifiers within said translation lookaside buffer while operating in a first mode of operation, each virtual address identifier having an associated real address entry for a single memory block and a single protection bit stored in association therewith wherein a selected virtual address may be translated into a corresponding real address utilizing said translation lookaside buffer; and means for storing up to N virtual address identifiers within said translation lookaside buffer while operating in a second mode of operation, each virtual address identifier having M protection bits stored in association therewith, said M protection bits stored in place of said associated real address entry stored within said translation lookaside buffer when said translation lookaside buffer is operating in said first mode of operation, where M is greater than 1, said protection bits indicative of a protection status for each of M contiguous memory blocks beginning with an associated virtual address identifier wherein memory block protection may be provided for up to N×M memory blocks.

7. The system for efficient memory management in a data processing system according to claim 6, wherein said means for storing up to N virtual address identifiers within said translation lookaside buffer while operating in a first mode of operation further includes means for storing a single protection bit in association with each virtual address identifier, said single protection bit indicative of a protection status for said associated real address entry.

8. The system for efficient memory management in a data processing system according to claim 7, wherein said means for storing up to N virtual address identifiers within said translation lookaside buffer while operating in a first mode of operation further includes means for storing a plurality of attribute bits in association with each virtual address identifier, said plurality of attribute bits indicative of the cache attributes for said associated real address entry.

9. The system for efficient memory management in a data processing system according to claim 6, wherein each memory block contains data and wherein each of said M protection bits comprises a write protection status bit for an associated memory block.

10. The system for efficient memory management in a data processing system according to claim 1, wherein each memory block contains instructions and wherein each of said M protection bits comprises an execution protection status bit for an associated memory block.

11. A data processing system comprising:

a processor;

a memory;

a memory management unit for mapping virtual addresses within said data processing system into real addresses within said memory, said memory management unit including:

a translation lookaside buffer;

means for storing up to N virtual address identifiers within said translation lookaside buffer while operating in a first mode of operation, each virtual address identifier having an associated real address entry for a single memory block and a single protection bit stored in association therewith wherein a selected virtual address may be translated into a corresponding real address utilizing said translation lookaside buffer; and means for storing up to N virtual address identifiers within said translation lookaside buffer while operating in a second mode of operation, each virtual address identifier having M protection bits stored in association therewith, said M protection bits stored in place of said associated real address entry stored within said translation lookaside buffer when said translation lookaside buffer is operating in said first mode of operation, where M is greater than 1, said protection bits indicative of a protection status for each of M contiguous memory blocks beginning with an associated virtual address identifier wherein memory block protection may be provided for up to N×M memory blocks.

12. The system for efficient memory management in a data processing system according to claim 11, wherein said means for storing up to N virtual address identifiers within said translation lookaside buffer while operating in a first mode of operation further includes means for storing a single protection bit in association with each virtual address identifier, said single protection bit indicative of a protection status for said associated real address entry.

13. The system for efficient memory management in a data processing system according to claim 12, wherein said means for storing up to N virtual address identifiers within said translation lookaside buffer while operating in a first mode of operation further includes means for storing a plurality of attribute bits in association with each virtual address identifier, said plurality of attribute bits indicative of the cache attributes for said associated real address entry.

14. The system for efficient memory management in a data processing system according to claim 11, wherein each memory block contains data and wherein each of said M protection bits comprises a write protection status bit for an associated memory block.

15. The system for efficient memory management in a data processing system according to claim 11, wherein each memory block contains instructions and wherein each of said M protection bits comprises an execution protection status bit for an associated memory block.

* * * * *